United States Patent Office 3,254,074
Patented May 31, 1966

1

3,254,074
SPIROXENONES
Glen E. Arth, Cranford, Harvey Schwam, New Brunswick, Franklin Township, and Lewis H. Sarett, Princeton, N.J., assignors to Merck & Co., Inc., Rahway, N.J., a corporation of New Jersey
No Drawing. Filed Apr. 25, 1962, Ser. No. 191,392
21 Claims. (Cl. 260—239.55)

This invention is concerned generally with novel steroids and processes of preparing the same. More particularly, it relates to novel 20-spirox-4-ene-3-ones, to the 7α-lower alkanoylthio-derivatives, 7α-mercapto, disulfide, lower alkylthio, sulfo and carboxy lower alkylthio derivatives, to the 6α and β-hydroxy and lower alkanoyloxy derivatives of any of the above and the 3-enol ethers thereof, and to closely related compounds, which steroids possess useful therapeutic properties as aldosterone inhibitors. This invention also relates to pharmaceutical compositions containing these novel steroid compounds.

This is a continuation-in-part of copending applications Serial Nos. 38,711, 38,772 and 38,773, all filed June 27, 1960 and now abandoned.

The name "20-spiroxane" is used to designate compounds having the following ring structure:

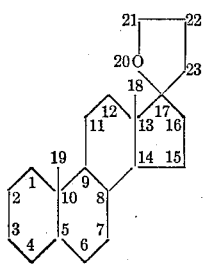

The novel "20-spirox-4-ene-3-ones" which form the subject of the instant invention accordingly are compounds having the following structural formula:

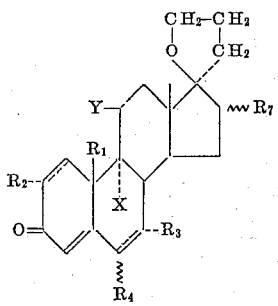

wherein the dotted lines between carbon atoms 1–2 and 6–7 indicate that a double bond may be present in these positions, and wherein $R_1$ may be hydrogen or methyl, $R_2$ may be hydrogen, methyl or halogen, Y may be hydrogen or a keto or hydroxy substituent, $R_3$ may be hydrogen, a lower alkanoylthio radical, mercapto, lower alkylthio, carboxy lower alkylthio, or a disulfide connecting two such steroid nucleii (i.e., a group —S—S—$R_5$ in which $R_5$ is a similar steroid nucleus to that to which the sulfur is attached) and X may be hydrogen or halogen; $R_4$ may be hydrogen, hydroxyl, lower ankanoyloxy, fluoro, lower alkyl, and $R_7$ may be hydrogen or lower alkyl. Among the radicals comprehended by the expression "(lower) alkanoyl" are formyl, acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms.

This invention also contemplates the preparation of 3-enol ethers of the above 20-spirox-4-ene-3-ones which enol ethers have the following structure:

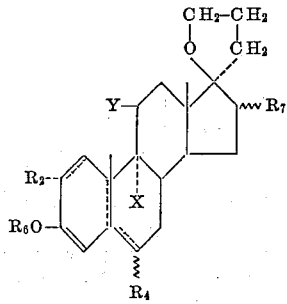

wherein $R_6$ stands for the lower alkyl, cyclohexyl or benzyl groups, $R_2$, X and Y and the 1,2 dotted line have the above definitions, and the 5,6 and 5,10 dotted lines indicate that when $R_1$ is hydrogen, the double bond on carbon 5 is to carbon 10 and when $R_1$ is methyl it is to carbon 6, bond on carbon 5 is to carbon 10 and when $R_1$ is methyl it is to carbon 6.

These novel steroids block the salt-retaining effects of aldosterone and other salt-retaining steroids so as to be useful in the treatment of diseases such as congestive heart failure, nephrosis and cirrhosis of the kidney in which aldosterone secretion is increased.

In preparing our novel chemical compounds, in which $R_1$ is methyl, the starting material utilized is a 20-spirox-4-ene-3,21-dione which may be identified by the following structural formula:

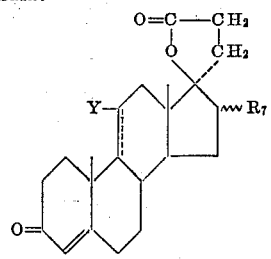

wherein the dotted line between carbon atoms 9 and 11 indicate that a double bond may be present in this position and wherein X refers to hydrogen or a hydroxy substituent.

In a specific embodiment of our invention, 20-spirox-4-ene-3,21-dione is utilized as the starting material. However, it is clear to those skilled in the art that other starting materials, such as the 20-spirox-4-ene-11β-ol-3,21-dione, the 20-spirox-4,9(11)-diene-3,21-dione, or derivatives thereof, may be similarly converted to the desired end products.

The 20-spirox-4-ene-3,21-dione is converted into the 3-ethylenedioxy-20-spirox-5-ene-21-one, which has the structure indicated below, for example, by exchange dioxolation using butanone dioxolane and an acidic agent such as p-toluenesulfonic acid monohydrate:

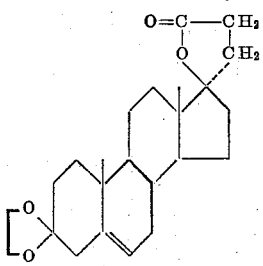

Upon treatment of 3-ethylenedioxy-20-spirox-5-ene-21-one in a solvent such as tetrahydrofuran with a stirred suspension of LiAlH₄ in the solvent, there is formed 3-ethylenedioxy-17α-(3′-hydroxypropyl)-5-androstene-17β-ol, which may be represented by the following formula:

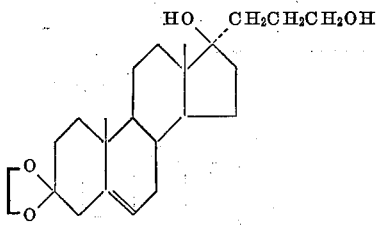

Treatment of 3-ethylenedioxy-17α-(3′-hydroxypropyl)-5-androstene-17β-ol with an aryl sulfonyl halide, such as p-toluenesulfonyl-chloride, in an organic base such as pyridine gives 3-ethylenedioxy-20-spirox-5-ene which has the following formula:

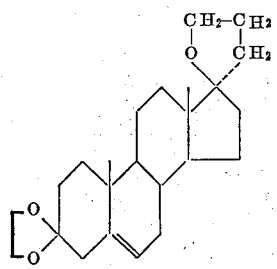

The 3-ethylenedioxy-20-spirox-5-ene, dissolved in acetone, is then treated with p-toluenesulfonic acid monohydrate for example, at room temperature to form 20-spirox-4-ene-3-one, which has the following formula:

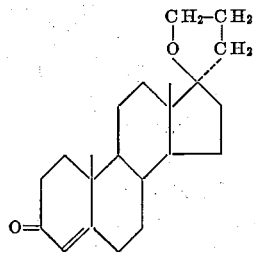

The 20-spirox-4-ene-3-one is converted into 20-spirox-1,4-diene-3-one by dehydrogenation with selenium dioxide.

The 20-spirox-4-ene-3-one is treated with chloranil in t-butanol to give 20-spirox-4,6-diene-3-one, which is then reacted with a lower thioalkanoic acid to give the 7α-alkanoylthio-20-spirox-4-ene-3-one which has the following structure:

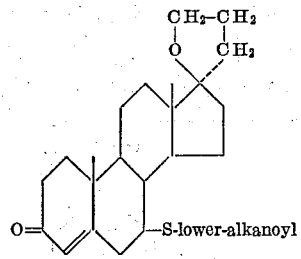

This reaction proceeds fairly rapily at elevated temperatures, such as those in excess of 50° C. and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, proceeded, where necessary by removal of excess thioalkanoic acid. If desired, however, the reaction product can be purified by chromatography using adsorbents such as silica gel or acid-washed alumina, followed by elution with mixtures of ethyl acetate in benzene.

The addition of the thioalkanoic acids to the 6,7-double bond of the starting materials employed in the practice of this invention proceeds under steric influences such that of the stereoisomers formed, one is obtained in predominant amount, which, in each case, has been characterized herein as possessing the α-configuration of the 7-acylthio-group. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The 20-spirox-4,6-diene-3-one is converted into 20-spirox-1,4,6-triene-3-one by dehydrogenation with selenium dioxide.

The 2α-methyl-20-spirox-4-ene-3-one is prepared from 20-spirox-4-ene-3-one by reaction of 20-spirox-4-ene-3-one with ethyl oxalate and methanolic sodium methoxide in t-butyl alcohol to form the sodium enolate of the 2-ethoxyoxalyl-derivative, which when methylated with methyl iodide, employing a solvent such as acetone, followed by removal of the ethoxyoxalyl group by sodium methoxide in methanol gives 2α-methyl-20-spirox-4-ene-3-one.

When the sodium enolate of the 2-ethoxyoxalyl derivative is treated with chlorine or with FClO₃, the 2α-chloro or 2α-fluoro derivative is obtained by removal of the ethoxyoxalyl group in a similar manner. Both of these derivatives can be treated in the same way as the 2α-methyl spiroxenones, as described below.

The 2α-methyl-20-spirox-4-ene-3-one is converted into the 2-methyl-20-spirox-1,4-diene-3-one by dehydrogenation with selenium dioxide.

The 2α-methyl-20-spirox-4-ene-3-one is converted into 2α-methyl-7α-acetylthio-20-spirox-4-ene-3-one by first heating with chloranil in a solvent such as t-butanol to give 2α-methyl-20-spirox-4,6-diene-3-one, and then reacting the latter compound with thioacetic acid to produce 2α-methyl-7α-acetylthio-20-spirox-4-ene-3-one.

The 2α-methyl-20-spirox-4,6-diene-3-one is dehydrogenated with selenium dioxide to give 2-methyl-20-spirox-1,4,6-triene-3-one.

The novel 9α-fluoro-20-spirox-4-ene-3,11-dione is prepared by the following steps, starting from the 20-spirox-4,9(11)-diene-3,21-dione which has the following formula:

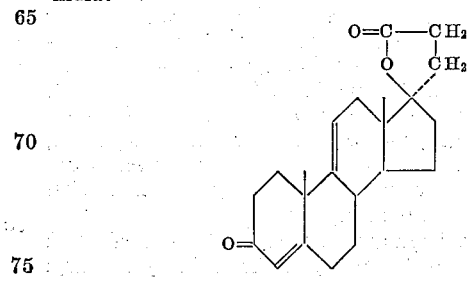

The 20-spirox-4,9(11)-diene-3,21-dione is reacted with butanone dioxolane and p-toluenesulfonic acid monohydrate to give 3-ethylenedioxy-20-spirox-5,9(11)-diene-3,21-dione. The latter compound is converted into 3-ethylenedioxy - 17α-(3'-hydroxypropyl)-5,9(11)-androstadiene-17β-ol by reaction with lithium aluminum hydride. The 3 - ethylenedioxy-17α-(3'-hydroxypropyl)-5,9(11)-androstadiene-17β-ol gives 3-ethylenedioxy-20-spirox-5,9(11)-diene on treatment with p-toluenesulfonyl chloride in the presence of pyridine at room temperature. The 3-ethylenedioxy-20-spirox-5,9(11)-diene, dissolved in acetone, is reacted with p-toluenesulfonic acid to give 20-spirox-4,9(11)-diene-3-one. The latter compound is treated with N-bromosuccinimide to give 9α-bromo-20-spirox-4-ene-11β-ol-3-one, which on heating with potassium acetate in absolute ethanol gives 20-spirox-4-ene-3-one-9,11β-oxide. The latter compound is then reacted with anhydrous hydrogen fluoride in tetrahydrofuran solution to give 9α-fluoro-20-spirox-4-ene-11β-ol-3-one, which compound is oxidized with chromic acid in pyridine to give the 9α-fluoro-20-spirox-4-ene-3,11-dione.

The 7α - acetylthio-9α-fluoro-20-spirox-4-ene-11β-ol-3-one is prepared from 9α-fluoro-20-spirox-4-ene-11β-ol-3-one by heating the latter compound with chloranil in t-butanol to give 9α-fluoro-20-spirox-4,6-diene-11β-ol-3-one, which is then reacted with thioacetic acid to produce 7α-acetylthio-9α-fluoro-20-spirox-4-ene-11β-ol-3-one.

The 7α-acetylthio-9α-fluoro-20-spirox-4-ene-3,11-dione is prepared from 9α-fluoro-20-spirox-4-ene-3,11-dione by heating the latter compound with chloranil in t-butanol to give 9α-fluoro-20-spirox-4,6-diene-3,11-dione, which is then reacted with thioacetic acid to produce 7α-acetylthio-9α-fluoro-20-spirox-4-ene-3,11-dione.

The novel 2α-methyl-7α-acetylthio-9α-fluoro-20-spirox-4-ene-3,11-dione is prepared by the following steps, starting with the 20-spirox-4,9(11)-diene-3-one. The 20-spirox-4,9(11)-diene-3-one is converted into the 2α-methyl-20-spirox-4,9(11)-diene-3-one by reaction with ethyl oxalate and methanolic sodium methoxide in t-butyl alcohol to form the sodium enolate of the 2-ethoxyoxalyl derivative, which when methylated with methyl iodide employing a solvent such as acetone, followed by removal of the ethoxyoxalyl group by sodium methoxide in methanol gives 2α-methyl-20-spirox-4,9(11)-diene-3-one. The latter compound is treated with N-bromosuccinimide to give 2α - methyl-9α-bromo-20-spirox-4-ene-11β-ol-3-one, which on heating with potassium acetate in absolute ethanol produces 2α-methyl-20-spirox-4-ene-3-one-9,11β-oxide. The latter compound is reacted with anhydrous hydrogen fluoride in tetrahydrofuran to give 2α-methyl-9α-fluoro-20-spirox-4-ene-11β-ol-3-one which compound is oxidized with chromic acid in pyridine to give 2α-methyl-9α-fluoro-20-spirox-4-ene-3,11-dione.

The 2α - methyl-9α-fluoro-7α-acetylthio-20-spirox-4,6-diene-3,11-dione is prepared from the 2α-methyl-9α-fluoro-20-spirox-4-ene-3,11-dione by heating the latter compound with chloranil in t-butanol to give 2α-methyl-9α-fluoro-20-spirox-4,6-diene-3,11-dione, which is then reacted with thioacetic acid to produce 2α-methyl-9α-fluoro-7α-acetylthio-20-spirox-4-ene-3,11-dione.

The novel 20-spirox-4-ene-3,11-dione is prepared from the 20-spirox-4-ene-11β-ol-3,21-dione by the following steps:

20-spirox-4-ene-11β-ol-3,21-dione is reacted with butanone dioxolane and p-toluenesulfonic acid monohydrate to give 3-ethylenedioxy-20-spirox-5-ene-11β-ol-21-one. The latter compound is converted into 3-ehtylenedioxy-17α - (3'-hydroxypropyl)-5-androstene-11β,17β-diol on treatment with lithium aluminum hydride. The 3-ethylenedioxy - 17α(3'-hydroxypropyl)-5-androstene-11β,17β-diol gives 3-ethylenedioxy-20-spirox-5-ene-11β-ol on treatment with p-toluenesulfonyl chloride in the presence of pyridine. The 3-ethylenedioxy-20-spirox-5-ene-11β-ol, dissolved in acetone, is reacted with p-toluenesulfonic acid monohydrate to give 20-spirox-4-ene-11β-ol-3-one, which compound is oxidized with chromic acid to give 20-spirox-4-ene-3,11-dione.

The 20-spirox-4-ene-11β-ol-3-one is dehydrogenated with selenium dioxide a give 20-spirox-1,4-diene-11β-ol-3-one.

The 20-spirox-4-ene-3,11-dione is treated with chloranil to give 20-spirox-4,6-diene-3,11-dione which is reacted with a lower thioalkanoic acid to give the 7α-lower alkanoylthio-20-spirox-4-ene-3,11-dione.

All of the above variations can equally well be carried out with a 16α or 16β-methyl substituent, by starting with the corresponding 16α or 16β-methyl-20-spirox-4-ene-3,21-dione and proceeding through the various steps described, to arrive at 16α or 16β-methyl-20-spirox-4-ene-3-one, into which one can introduce a $\Delta^1$ double bond and/or a $\Delta^6$ double bond. The $\Delta^{4,6}$ diene with a 16-methyl substituent, so produced will give the corresponding $\Delta^4$-ene-7-acetylthio product, as described above for the 7-hydrogeno compound. A 2α-methyl or halogeno group can likewise be introduced as described above and all the similar transformations can be carried out on the resulting 2,16-dimethyl or 2-halo-16-methyl compounds.

When any of the 7α-acetylthio compounds described previously is stirred at room temperature for a short time with a base such as sodium methoxide in an alkanol such as methanol in the absence of air, the acetyl group is removed to yield a mercapto group. Thus, 20-spirox-4-ene-7α-acetylthio-3-one yields 20-spirox-4-ene-7α-thiol-3-one of the structure:

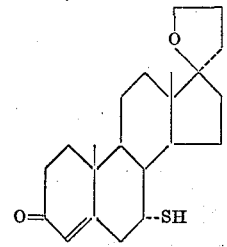

Similarly, starting from the corresponding 7α-acetylthio compound, there can be prepared, e.g., 7α-spirox-1,4-diene-7α-thiol-3-one, 9α-fluoro-20-spirox-1,4-diene-7α-thiol-3,11-dione or any of the other 7α-thiols corresponding to 7α-acetylthio compounds described. Extended reaction times, excessive temperatures and large excesses of base should be avoided in this reaction.

When any of these 7α-mercapto compounds is oxidized by cold dilute hydrogen peroxide in an alcohol such as methanol, the corresponding disulfide is formed. Thus, 20-spirox-4-ene-7α-thiol-3-one yields bis(20-spirox-4-ene-3-one)-7α-disulfide of the structure:

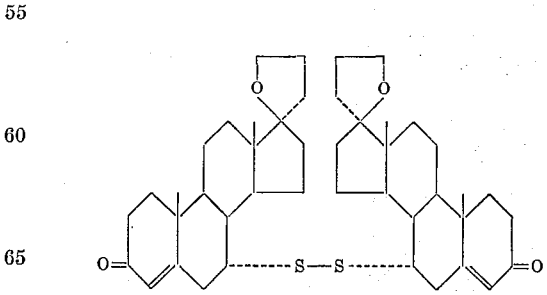

When any of the thiols described above is treated with a lower alkanoyl halide in the presence of a tertiary base such as pyridine, the corresponding 7α-lower alkanoylthio compound is regulated. Thus, other 7α-lower alkanoylthio derivatives are readily prepared. The formates are prepared by using 98% formic acid at room temperature. Thus, using t-butyl acetyl chloride and pyridine and 20- spirox-4-ene-7α-thiol-3-one, one obtains the corresponding 7α-t-butylacetylthio compound of the structure:

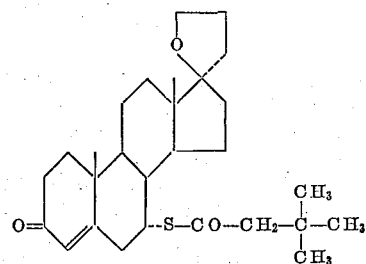

When any of the 7α-thiols produced above is stirred with an acid acceptor such as a carbonate in a solvent such as acetone and a halogeno-lower alkanoic acid such as chloracetic acid or α-bromobutyric acid, the corresponding 7α-carboxyalkylthio compound is obtained. Thus, 20-spirox-4-ene-7α-thiol-3-one and bromacetic acid in acetone in the presence of $K_2CO_3$ yields 20-spirox-4-ene-7α-carboxymethylthio-3-one, of the structure:

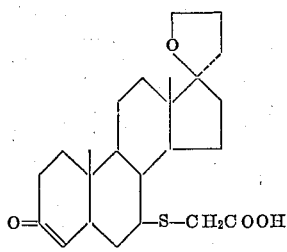

The use of a lower alkyl halide instead of the halogeno alkanoic acid yields the corresponding lower alkylthio compound.

Other substituents which may be introduced into any of the spiroxenones mentioned above are 6-hydroxyl or lower alkanoyloxy groups. This is carried out by treating the spiroxenone with orthoformic ester and dinitrobenzenesulfonic acid in an inert solvent to form a $\Delta^{3,5(6)}$-3-enol ether, which is then reacted with perphthalic acid to form the 6β-hydroxy spiroxenone. The hydroxyl can be acylated at room temperature with a lower alkanoic anhydride in the presence of a tertiary base to give the 6β-lower alkanoyloxy spiroxenone which is inverted to the 6α-lower alkanoyloxy compound by cold HCl in chloroform and the latter is readily hydrolyzed by an alcoholc base such as methanolic KOH or bicarbonate at room temperature to give the corresponding 6-hydroxy compound. These reactions can be illustrated, using 20-spirox-4-ene-3-one as the example, by the following equation:

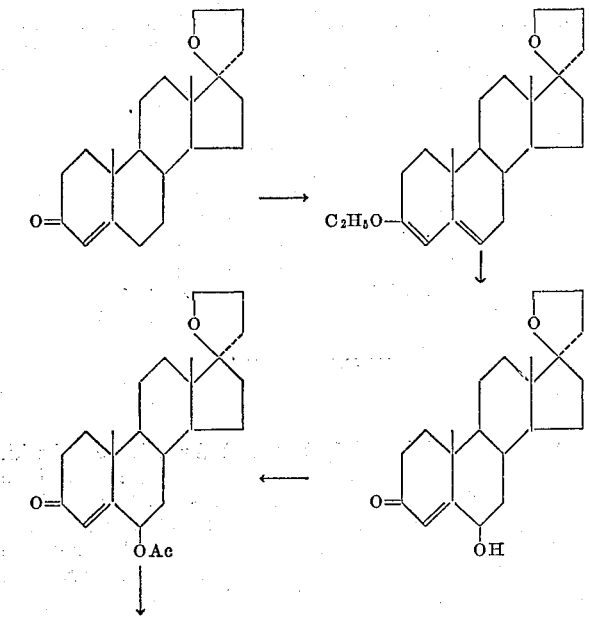

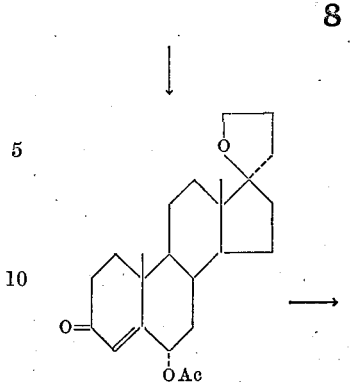

Similarly, a 6α-fluoro or methyl substituent can be introduced by reaction of the corresponding 3-ethylene dioxy-20-spirox-5-ene with perbenzoic acid to form a 5,6-epoxy compound. When this is treated with boron trifluoride a 5-hydroxy-6-fluoro intermediate is formed which is reacted with methanolic KOH to regenerate the $\Delta^4$ double bond. If the 5,6-epoxy compound is treated with a lower alkyl magneisum halide, such as methyl magneisum bromide, followed by methanolic KOH dehydration, a 6-lower alkyl group is introduced instead of the 6-fluoro. These 3-ethylene-dioxy 6α or β-fluoro or methyl-20-spirox-4-enes are then used in any of the other transformations described above to form the corresponding 6-fluoro or methyl spiroxenes.

The novel 3-enol ethyl ethers of the 20-spirox-4-ene-3-ones are prepared by stirring a mixture of the 20-spirox-4-ene-3-one and ethyl orthoformate in dioxane in the presence of a strong acid catalyst such as a mineral acid or an organic sulfonic acid for approximately 3 hours at about 25° C. The acid catalyst is then neutralized with a base such as pyridine. The reaction mixture is extracted with a suitably organic solvent, such as ether, and the ether extract dried and evaporated under reduced pressure. The residue is chromatographed to obtain the corresponding 3-ethoxy-20-spirox-3,5-diene.

The 3-enol n-propyl ethers of the 20-spirox-4-ene-3-one are prepared by stirring a mixture of the 20-spirox-4-ene-3-one and n-propyl orthoformate in dioxane for approximately 6 hours at about 30° C. The product is recovered as described above for the ethyl ether.

The 3-enol n-butyl ethers of the 20-spirox-4-ene-3-ones are prepared by heating a mixture of the 20-spirox-4-ene-3-one with iso-octane (2,2,4-trimethylpentane) with n-butanol and p-toluenesulfonic acid for about 32 hours in an apparatus equipped with means for removing the water from the distillate and return of the dry distillate to the reaction mixture. The acid catalyst is then neutralized with a base such as pyridine and the liquid is evaporated to dryness in vacuo. The residue is purified by crystallization from methanol containing traces of pyridine or by chromatography, to give the corresponding 3-n-butoxy-20-spirox-3,5-diene.

The 3-enol cyclohexyl ethers of the 20-spirox-4-ene-3-ones are prepared in the same manner as the 3-enol n-butyl ethers, but using cyclohexanol in place of the n-butanol.

The 3-enol benzyl ethers of the 20-spirox-4-ene-3-ones are prepared by adding the 3-ethoxy-20-spirox-3,5-diene to an anhydrous mixture of benzene, benzyl alcohol and p-toluenesulfonic acid. The reaction mixture is heated at the boiling point for about 30 minutes with slow continuous co-distillation of benzene and ethanol. The reaction mixture is then cooled to room temperature, made alkaline with pyridine and concentrated to dryness under reduced pressure. The residue is purified by crystallization from methanol containing traces of pyridine, or by chromatography, to give the corresponding 3-benzyloxy-20-spirox-3,5-diene.

A further embodiment of our invention comprises novel pharmaceutical compositions containing these 20-spirox- 4-ene-3-ones, exemplified in the foregoing structures, as well as the 3-enol ethers thereof. A preferred embodiment of my invention comprises phamaceutical compositions containing these 20-spirox-4-ene-3-one compounds combined with diuretics such as chlorothiazide, hydrochlorothiazide, and related compounds.

In preparing our novel chemical compounds in which $R_1$ is hydrogen, the starting material utilized is the 3-methoxy - 17α - (3'-hydroxypropyl)-1,3,5(10)-estratriene - 17β - ol, or the 11-oxygenated-3-methoxy-17α-(3'-hydroxypropyl)-1,3,5(10)-estratriene-17β-ol, which has the formula:

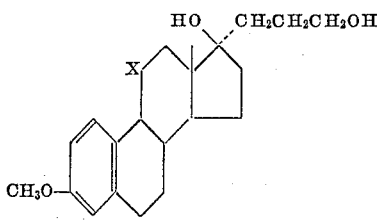

wherein X is hydrogen, or a keto or hydroxy group.

In a specific embodiment of our invention, 3-methoxy-17α - (3' - hydroxypropyl) - 1,3,5(10)-estratriene-17β-ol, which is rerpesented by the following formula:

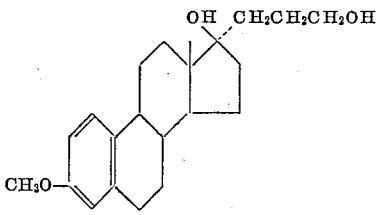

is utilized as the starting material. However, it is clear to those skilled in the art that other materials, such as those described above, may be similarly converted to the desired end product.

The 3-methoxy-17α-(3-hydroxypropyl)-1,3,5(10)-estratriene-17β-ol is reacted with an organic sulfonyl halide, such as methane sulfonyl chloride, benzene sulfonyl chloride or p-toluenesulfonyl chloride in the presence of an organic base, such as pyridine, at room temperature to give 3-methoxy-19-nor-20-spirox-1,3,5(10)-triene, which has the following structure:

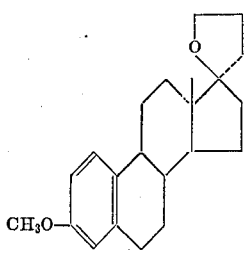

Upon adding lithium to a mixture of 3-methoxy-19-nor-20-spirox-1,3,5(10)-triene in anhydrous ammonia and an anhydrous solvent such as tetrahydrofuran, there is formed 3-methoxy-19-nor-20-spirox-2,5(10)-diene which may be represented by the following formula:

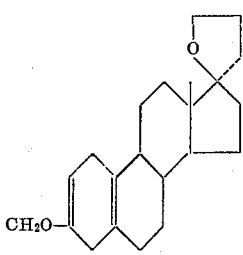

The 3-methoxy-19-nor-20-spirox-2,5(10)-diene is then treated with an acidic reagent, for example, aqueous oxalic acid, in order to obtain 19-nor-20-spirox-5(10)-ene-3-one which has the following structure:

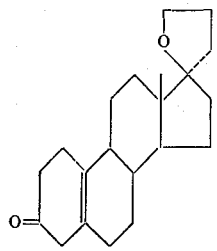

Treatment of 19-nor-20-spirox-5(10)-ene-3-one with a metal alkoxide, such as sodium methylate, in a lower alkanol, for example, methanol gives 19-nor-20-spirox-4-ene-3-one, which has the following formula:

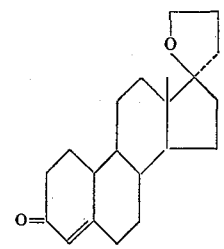

By using the reactions previously described for 20-spirox-4-ene-3-one, this 19-nor-20-spirox-4-ene-3-one is converted into similar derivatives. Thus, the corresponding 4,6-diene is readily prepared by reaction with chloranil. This is reacted with a lower thioalkanoic acid to yield the corresponding 7-alkanoylthio derivative and this can be transformed into mercapto disulfide, alkylthio, and, sulfo compounds as in the case of the 19-methyl compounds. A 2α-methyl group is introduced into the 19-nor-20-spirox-4-ene-3-one by successive reaction with ethyl oxalate, sodium methoxide and methyl iodide, as in the 19-methyl series and such 2α-methyl-19-nor compounds are transformed into the 4,6-diene and eventually to 7-alkanoylthio derivatives, as before. The novel 3-enol ethers of the 19-nor compounds are also prepared by using the same reactions as previously described for the 19-methyl compounds.

The following examples illustrate methods of carrying out the present invention but it is to be understood that these examples are given for purposes of illustration and not of limitation.

EXAMPLE 1

A solution of 1 g. of 3-ethylenedioxy-20-spirox-5-ene-21-one in 50 cc. of dry tetrahydrofuran is added slowly to a stirred suspension of 1 g. of $LiAlH_4$ in 50 cc. of dry tetrahydrofuran. The mixture is stirred at room temperature overnight. Ethyl acetate is added dropwise to the stirred mixture until the excess $LiAlH_4$ has been decomposed. Water (13 ml.) is then added dropwise to precipitate the aluminum as hydrated oxides, which are then separated by filtration. The filtrate is evaporated to dryness and crystallized from ether to give 3-ethylene-dioxy-17α-(3'-hydropropyl)-5-androstene-17β-ol.

The 3-ethylenedioxy-20-spirox-5-ene-21-one used as the starting material is prepared from 20-spirox-4-ene-3,21-dione by the following procedure:

A mixture of 1.850 g. of 20-spirox-4-ene-3,21-dione (A), 100 cc. of butanone dioxolane (distilled from lithium aluminum hydride) and 60 mg. of p-toluenesulfonic acid monohydrate is distilled for 4¾ hours through a Vigreaux column. The residue is partitioned between 5% aqueous sodium bicarbonate and benzene. The organic layer is washed with water and dried, and the solvent is removed in vacuo. The residue is chromatographed over 50 gms. of acid-washed alumina and eluted with mixtures of ether and chloroform to give 3-ethylenedioxy-20-spirox-5-ene-21-one (B).

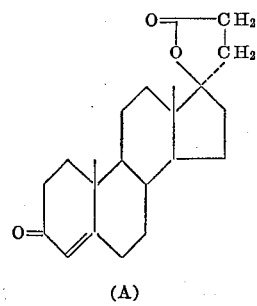
(A)

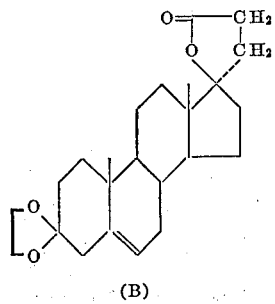
(B)

EXAMPLE 2

To 3 g. of 3-ethylenedioxy-17α-(3'-hydroxypropyl)-5-androstene -17β-ol in 6 ml. of pyridine is added 2 g. of p-toluenesulfonyl chloride. The solution is stirred for 16 hours at room temperature. Water is then added dropwise until crystals appear. The crystals are collected on a filter and washed with water to yield 2.88 g. of 3-ethylenedioxy-20-spirox-5-ene, which has the following formula:

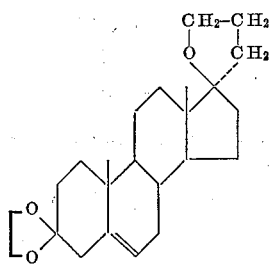

EXAMPLE 3

Seventy-three milligrams of 3-ethylenedioxy-20-spirox-5-ene is dissolved in 4 cc. of acetone and 5 mg. of p-toluenesulfonic acid monohydrate and 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of petroleum ether and ether. Recrystallization from a mixture of methylene chloride and ether affords the substantially pure 20-spirox-4-ene-3-one, which has a M.P. 88–91° C., $\lambda_{max.}^{methanol}$ 240.5 mμ ε percent 480 and the following structure:

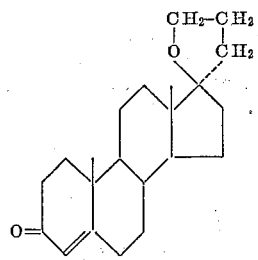

EXAMPLE 4

To 100 mg. of 20-spirox-4-ene-3-one in 5 ml. of t-butanol and 0.1 ml. of acetic acid is added 50 mg. of selenium dioxide. The mixture is reflected under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 20-spirox-1,4-diene-3-one, which shows $\lambda_{max.}^{methanol}$ 244 mμ ε percent 440 and has the following structure:

EXAMPLE 5

A suspension of 20-spirox-4-ene-3-one (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 20-spirox-4,6-diene-3-one, which has the M.P. 98–100° C., $\lambda_{max.}^{methanol}$ 286 mμ ε percent 807 and the following structure:

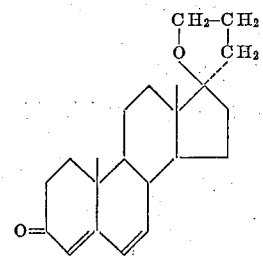

EXAMPLE 6

A solution of 80 mg. of 20-spirox-4,6-diene-3-one in 1.0 ml. of thioacetic acid is heated on a steam bath for a period of 2 hours. Excess thioacetic acid is evaporated in a stream of nitrogen. Trituration with ether affords crystals, which after two recrystallizations from a mixture of acetone and hexane, gives 7α-acetylthio-20-spirox-4-ene-3-one, which has the M.P. 180–182° C., $\lambda_{max.}^{CH_3OH}$ 238 mμ ε percent 476 and the following structure:

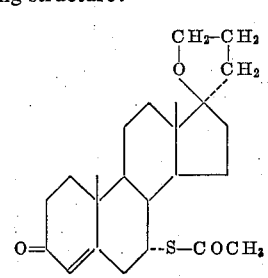

EXAMPLE 7

To a solution of 20-spirox-4,6-diene-3-one (0.50 g.) in 20 ml. of t-amyl alcohol is added 2.97 g. of selenium dioxide and 2.82 g. of mercuric oxide. The mixture is heated under reflux overnight under nitrogen. An additional 2 g. of selenium dioxide is then added and refluxing is continued for six more hours. The dark precipitate is removed by filtration and washed thoroughly with chloroform. The yellow filtrate is washed with sodium bicarbonate solution, and water, and dried over anhydrous sodium sulfate. Removal of the solvent in vacuo affords an oily residue which is purified by chromatography over acid-washed alumina. The product is adsorbed from benzene; the column is washed with ether and eluted with chloroform. Recrystallization of the chloroform eluate from acetone-ether yields the 20-spirox-1,4,6-triene-3-one which has the following formula:

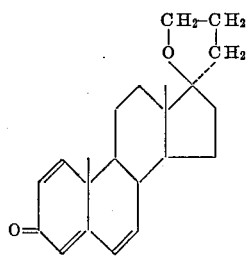

EXAMPLE 8

To 8.0 g. of 20-spirox-4-ene-3-one suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Complete solution occurs. Addition of petroleum ether followed by filtration gives 13 g. of the sodium enolate, which is a powder, soluble in water but insoluble in dilute acid.

A mixture of the crude sodium enolate, 13 g. of anhydrous potassium carbonate, 300 ml. of acetone and 50 ml. of methyliodide is refluxed for 20 hours, filtered while hot and the filtrate concentrated to a small volume. A large amount of water is added to the concentrate which is then extracted with ethyl acetate. The extract is washed with saturated sodium chloride solution, dried and treated with activated carbon. After evaporation 7.8 g. of a pale yellow residue is obtained, To this residue, dissolved in 250 ml. of absolute alcohol, is added 1.0 g. of 95% $NaOCH_3$. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves 5.7 g. of the crude 2α-methyl-20-spirox-4-ene-3-one which has the following formula:

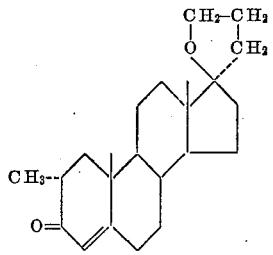

EXAMPLE 9

To 100 mg. of 2α-methyl-20-spirox-4-ene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 2-methyl-20-spirox-1,4-diene-3-one, which has the following formula:

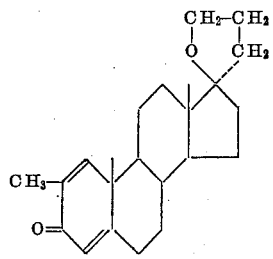

EXAMPLE 10

A suspension of 2α-methyl-20-spirox-4-ene-3-one (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 2α-methyl-20-spirox-4,6-diene-3-one which has the following structure:

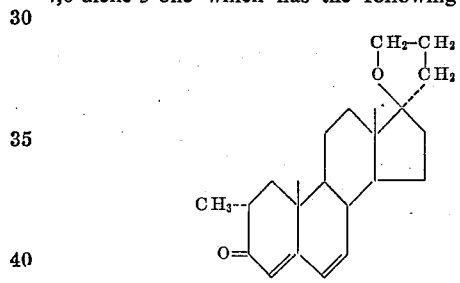

EXAMPLE 11

A solution of 80 mg. of 2α-methyl-20-spirox-4,6-diene-3-one in 1.0 ml. of thioacetic acid is heated on a steam bath for a period of ½ hour. Excess thioacetic acid is evaporated in a stream of nitrogen. Trituration with ether affords crystals which, after two recrystallizations from a mixture of acetone and hexane, gives 2α-methyl-7α-acetylthio-20-spirox-4-ene-3-one which has the following structure:

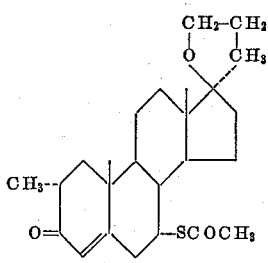

EXAMPLE 12

A mixture of 1.850 g. of 20-spirox-4,9(11)-diene-3,21-dione, 100 cc. of butanone dioxolane (distilled from lithium aluminum hydride) and 60 mg. of p-toluenesulfonic acid monohydrate is distilled for 4¾ hours through a Vigreaux column. The residue is partitioned between 5% aqueous sodium bicarbonate and benzene. The organic layer is washed with water and dried, and the solvent is removed in vacuo. The residue is chromatographed over 50 gms. of acid-washed alumina and eluted with mixtures of ether and chloroform to give 3-ethylenedioxy-20-spirox-5,9(11)-diene-21-one which has the following structure:

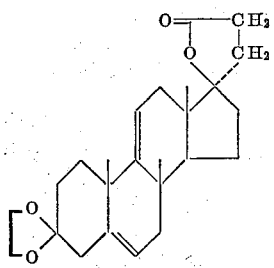

EXAMPLE 13

A solution of 1 g. of 3 - ethylenedioxy - 20 - spirox-5,9(11)-diene-21-one in 50 cc. of dry tetrahydrofuran is added slowly to a stirred suspension of 1 g. of LiAlH₄ in 50 cc. of dry tetrahydrofurane. The mixture is stirred at room temperature overnight. Ethyl acetate is added dropwise to the stirred mixture until the excess LiAlH₄ has been decomposed. Water (13 ml.) is then added dropwise to precipitate the aluminum as hydrated oxides, which are then separated by filtration. The filtrate is evaporated to dryness and crystallized from ether to give 3-ethylene-dioxy - 17α - (3' - hydroxypropyl) - 5,9(11)-androstadiene-17β-ol.

EXAMPLE 14

To 3 g. of 3-ethylenedioxy-17α-(3'-hydroxypropyl)-5,9(11)-androstadiene-17β-ol in 30 ml. of pyridine is added 2 g. of p-toluenesulfonyl chloride. The solution is stirred for 16 hours at room temperature. Water is then added dropwise until crystals appear. The crystals are collected on a filter and washed with water to yield 3-ethylenedioxy-20-spirox-5,9(11)-diene, which has the following structure:

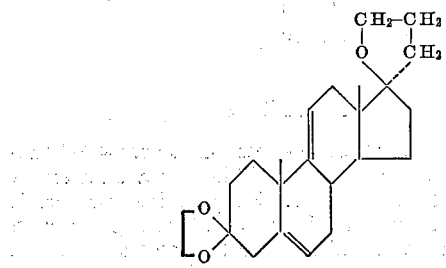

EXAMPLE 15

Seventy-three milligrams of 3-ethylenedioxy-20-spirox-5,9(11)-diene is dissolved in 4 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of petroleum ether and ether. Recrystallization from a mixture of methylene chloride and petroleum ether affords the substantially pure 20-spirox-4,9(11)-diene-3-one, which has the M.P. 171–173° C. and the following structure:

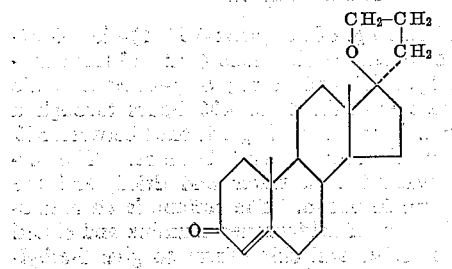

EXAMPLE 16

To a mixture of 620 mg. of 20-spirox-4,9(11)-diene-3-one and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the product is filtered, washed with water, and dried in air to give 9α-bromo-20-spirox-4-ene-11β-ol-3-one which has the following structure:

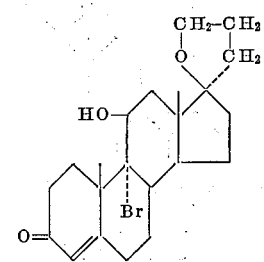

EXAMPLE 17

A solution of 210 mg. of 9α-bromo-20-spirox-4-ene-11β-ol-3-one and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from ethyl acetate-petroleum ether to give 20-spirox-4-ene-3-one-9,11β-oxide, which has the following structure:

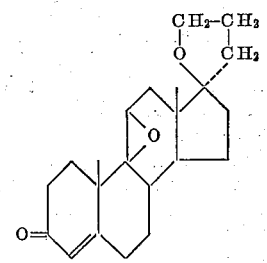

EXAMPLE 18

To a solution of 200 mg. of 20-spirox-4-ene-3-one-9,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −6° C. the mixture is cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from acetone-ether gives 9α-fluoro-20-spirox-4-ene-11β-ol-3-one which has the following formula:

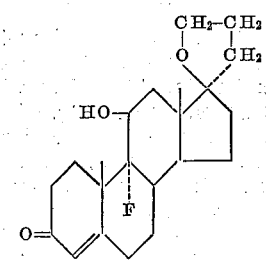

EXAMPLE 19

A suspension of 9α-fluoro-20-spirox-4-ene-11β-ol-3-one and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 9α-fluoro-20-spirox-4,6-diene-11β-ol-3-one, which has the following structure:

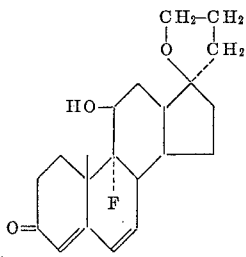

EXAMPLE 20

A solution of 80 mg. of 9α-fluoro-20-spirox-4,6-diene-11β-ol-3-one in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-9α-fluoro-20-spirox-4-ene-11β-ol-3-one, which has the following formula:

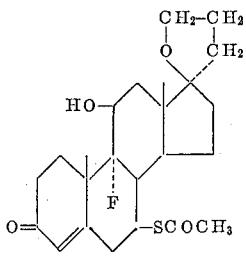

EXAMPLE 21

A mixture of 1.850 g. of 20-spirox-4-ene-11β-ol-3,21-dione, 100 cc. of butanone dioxolane (distilled from lithium aluminum hydride) and 60 mg. of p-toluenesulfonic acid monohydrate is distilled for 4¾ hours through a Vigreaux column. The residue is partitioned between 5% aqueous sodium bicarbonate and benzene. The organic layer is washed with water and dried, and the solvent is removed in vacuo. The residue is chromatographed over 50 gms. of acid-washed alumina and eluted with mixtures of ether and chloroform to give 3-ethylenedioxy-20-spirox-5-ene-11β-ol-21-one, which has the following formula:

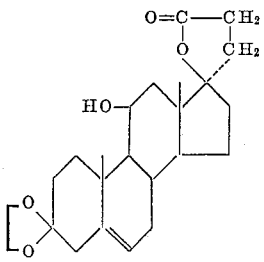

EXAMPLE 22

A solution of 1 g. of 3-ethylenedioxy-20-spirox-5-ene-11β-ol-21-one in 50 cc. of dry tetrahydrofuran is added slowly to a stirred suspension of 1 g. of LiAlH₄ in 50 cc. of dry tetrahydrofuran. The mixture is stirred at room temperature overnight. Ethyl acetate is added dropwise to the stirred mixture until the excess LiAlH₄ has been decomposed. Water (13 ml.) is then added dropwise to precipitate the aluminum as hydrated oxides, which are then separated by filtration. The filtrate is evaporated to dryness and crystallized from ether to give 3-ethylenedioxy-17α-(3'-hydroxypropyl) - 5 - androstene-11β,17β-diol, which has the following formula:

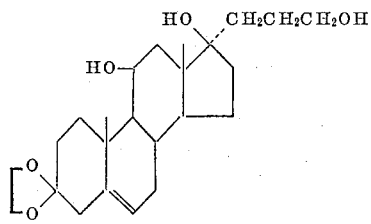

EXAMPLE 23

To 3 g. of 3-ethylenedioxy-17α-(3'-hydroxypropyl)-5-androstene-11β,17β-diol in 6 ml. of pyridine is added 2 g. of p-toluenesulfonyl chloride. The solution is stirred for sixteen hours at room temperature. Water is then added dropwise until crystals appear. The crystals are collected on a filter and washed with water to yield 2.88 g. of 3-ethylenedioxy-20-spirox-5-ene-11β-ol, which has the following formula:

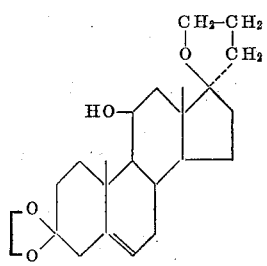

EXAMPLE 24

Seventy-three milligrams of 3-ethylenedioxy-20-spirox-5-ene-11β-ol is dissolved in 44 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of petroleum ether and ether. Recrystallization from a mixture of methylene chloride and ether affords 20-spirox-4-ene-11β-ol-3-one, which has the following formula:

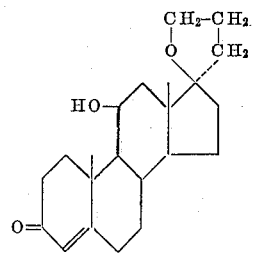

EXAMPLE 25

To 100 mg. of 20-spirox-4-ene-11β-ol-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 20-spirox-1,4-diene-11β-ol-3-one, which has the following formula:

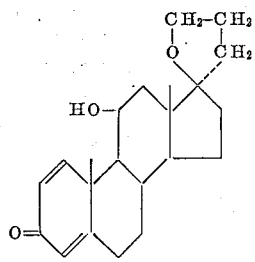

In accordance with the above procedure, but using 20-spirox-4-ene-3,11-dione in place of 20-spirox-4-ene-11β-ol-3-one, there is obtained the corresponding 20-spirox-1,4-diene-3,11-dione.

EXAMPLE 26

A suspension of 20-spirox-4-ene-11β-ol-3-one (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 20-spirox-4,6-diene-11β-ol-3-one, which has the following formula:

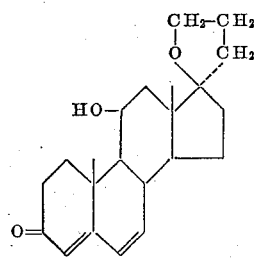

In accordance with the above procedure, but using 20-spirox-4-ene-3,11-dione in place of 20-spirox-4-ene-11β-ol-3-one, there is obtained the corresponding 20-spirox-4,6-diene-3,11-dione.

EXAMPLE 27

To 100 mg. of 20-spirox-4,6-diene-11β-ol-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 20-spirox-1,4,6-triene-11β-ol-3-one which has the following formula:

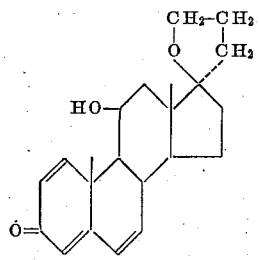

In accordance with the above procedure, but using 20-spirox-4,6-diene-3,11-dione in place of 20-spirox-4,6-diene-11β-ol-3-one, there is obtained the corresponding 20-spirox-1,4,6-triene-3,11-dione.

EXAMPLE 28

A solution of 80 mg. of 20-spirox-4,6-diene-11β-ol-3-one in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-20-spirox-4-ene-11β-ol-3-one, which has the following formula:

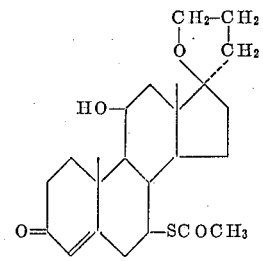

In accordance with the above procedure, but using 20-spirox-4,6-diene-3,11-dione in place of 20-spirox-4,6-diene-11β-ol-3-one, there is obtained the corresponding 7α-acetylthio-20-spirox-4-ene-3,11-dione.

EXAMPLE 29

A solution of 400 mg. of 20-spirox-4-ene-11β-ol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-petroleum ether to give 20-spirox-4-ene-3,11-dione, which has the following formula:

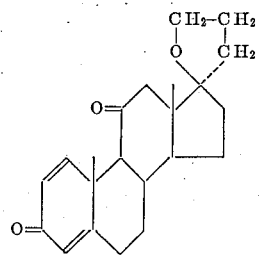

EXAMPLE 30

A mixture of 1.5 parts by weight of 20-spirox-4,6-diene-3-one and 1.5 parts by volume of thiopropionic acid is heated on the steam bath for 3 hours. After standing overnight, the reaction mixture is diluted with 25 parts by volume of ether. The crystals which form on cooling are separated and recrystallized from ether and petroleum ether to obtain 7α-propionylthio-20-spirox-4-ene-3-one, which has the following formula:

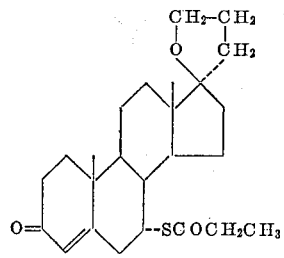

In accordance with the above procedure, but starting with the 20-spirox-4,6-diene-11β-ol-3-one in place of the 20-spirox-4,6-diene-3-one, there is obtained the 7α-propionylthio-20-spirox-4-ene-11β-ol-3-one.

EXAMPLE 31

To 8.0 g. of 20-spirox-4-9(11)-diene-3-one, suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Complete solution occurs. Addition of petroleum ether-ether followed by filtration gives 13 g. of the sodium enolate, which is a powder, soluble in water but insoluble in dilute acid.

A mixture of the crude sodium enolate, 13 g. of anhydrous potassium carbonate, 300 ml. of acetone and 50 ml. of methyl iodide is refluxed for 20 hours, filtered while hot and the filtrate concentrated to a small volume. A large amount of water is added to the concentrate which is then extracted with ethyl acetate. The extract is washed with saturated sodium chloride solution, dried and treated with activated carbon. After evaporation 7.8 g. of a pale yellow residue is obtained.

To this residue, dissolved in 250 ml. of absolute alcohol, is added 1.0 g. of 95% sodium methylate. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves 5.7 g. of the crude 2α-methyl-20-spirox-4,9(11)-diene-3-one, which has the following formula:

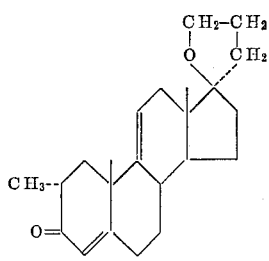

EXAMPLE 32

To 100 mg. of 2α-methyl-9α-fluoro-20-spirox-4-ene-11β-ol-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute amonnia water, water, dilute hydrochloric acid and water, and then dried over magnesium sulfate. The extract is treated with activated charcoal and then concentrated to dryness. Crystallization of the residue from a mixture of acetone and ether gives pure 2α-methyl-9α-fluoro-20-spirox-1,4-diene-11β-ol-3-one.

In accordance with the above procedure, but using the 9α-fluoro-20-spirox-4-ene-11β-ol-3-one in place of the 2α-methyl-9α-fluoro-20-spirox-4-ene-11β-ol-3-one, there is obtained the 9α-fluoro-20-spirox-1,4-diene-11β-ol-3-one.

EXAMPLE 33

To a mixture of 620 mg. of 2α-methyl-20-spirox-4,9(11)-diene-3-one and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the product is filtered, washed with water, and dried in air to give 2α-methyl-9α-bromo-20-spirox-4-ene-11β-ol-3-one which has the following formula:

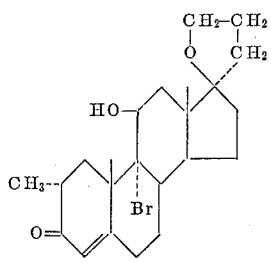

EXAMPLE 34

A solution of 210 mg. of 2α-methyl-9α-bromo-20-spirox-4-ene-11β-ol-3-one and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from a mixture of ethyl acetate and ether to give 2α-methyl-20-spirox-4-ene-3-one-9,11β-oxide, which has the following formula:

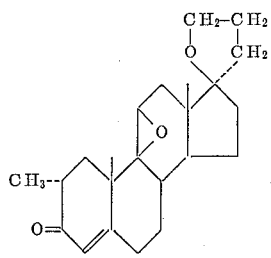

EXAMPLE 35

To a solution of 200 mg. of 2α-methyl-20-spirox-4-ene-3-one-9,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −6° C. the mixture is cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 2α-methyl-9α-fluoro-20-spirox-4-ene-11β-ol-3-one which has the following structure:

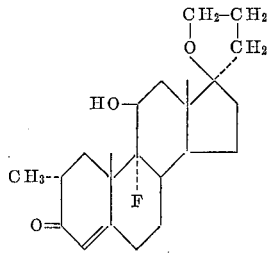

EXAMPLE 36

A solution of 400 mg. of 2α-methyl-9α-fluoro-20-spirox-4-ene-11β-ol-3-one in 4 ml. of pyridine is added to the complex formed by the addition of 400 mg. of chromium trioxide in 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-ether to give 2α-methyl-9α-fluoro-20-spirox-4-ene-3,11-dione, which has the following formula:

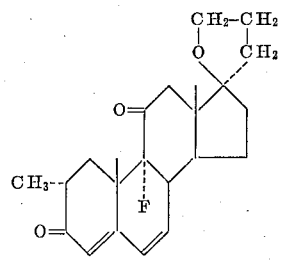

EXAMPLE 37

A suspension of 2α-methyl-9α-fluoro-20-spirox-4-ene-11β-ol-3-one (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 2α-methyl-9α-fluoro-20-spirox-4,6-diene-11β-ol-3-one, which has the following formula:

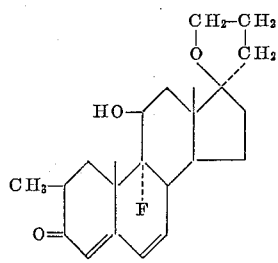

In accordance with the above procedure, but starting with 2α-methyl-9α-fluoro-20-spirox-4-ene-3,11-dione in place of 2α-methyl-9α-fluoro-20-spirox-4-ene-11β-ol-3-one there is obtained 2α-methyl-19α-fluoro-20-spirox-4,6-diene-3,11-dione.

EXAMPLE 38

A solution of 80 mg. of 2α-methyl-9α-fluoro-20-spirox-4,6-diene-11β-ol-3-one in 1.0 ml. of thioacetic acid is heated on a steam bath for a period of ½ hour. Excess thioacetic acid is evaported in a stream of nitrogen. Trituration with ether affords crystals which, after two recrystallizations from a mixture of acetone and hexane, gives 2α-methyl-7α-acetylthio-9α-fluoro-20-spirox-4-ene-11β-ol-3-one, which has the following formula:

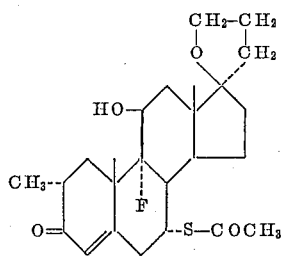

In accordance with the above procedure, but starting with 2α-methyl-9α-fluoro-20-spirox-4,6-diene-3,11-dione in place of 2α-methyl-7α-lower alkanoylthio-20-spirox-4-ene-11β-ol-3-one there is obtained 2α-methyl-9α-fluoro-7α-acetylthio-20-spirox-4-ene-3,11-dione.

EXAMPLE 39

Two grams of 20-spirox-4-ene-3-one, 0.120 g. of 2,4-dinitrobenzenesulfonic acid, 60 ml. of dry dioxane and 4 ml. of freshly distilled ethyl orthoformate are stirred at 25° C. for three hours. The acid catalyst is then neutralized by addition of 2 ml. of pyridine. The reaction mixture is diluted with water and extracted with ether. The combined ether extracts are washed with water, dried, and evaporated under reduced pressure. The residue is chromatographed over alumina (alkaline) and eluted with mixtures of ether and petroleum ether to separate substantially pure 3-ethoxy-20-spirox-3,5-diene, which has the following formula:

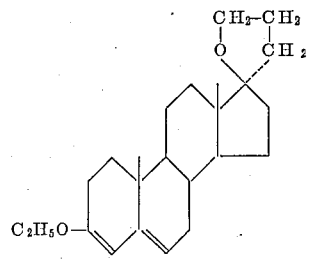

In accordance with the above procedure, but using the following compounds in place of the 20-spirox-4-ene-3-one, there is obtained the corresponding 3-ethoxy-20-spirox-3,5-diene:

20-spirox-4-ene-3,11-dione
2α-methyl-20-spirox-4-ene-3-one
2α-methyl-9α-fluoro-20-spirox-4-ene-3,11-dione

EXAMPLE 40

Ten grams of 20-spirox-4-ene-11β-ol-3-one, 100 ml. of absolute ethanol (distilled from calcium hydride), 10 ml. of ethylorthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-20-spirox-3,5-diene-11β-ol, which has the following structure:

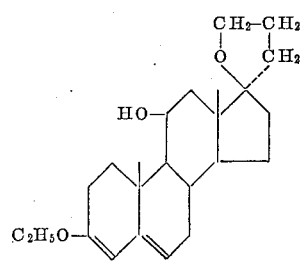

In accordance with the above structure, but using the following compounds in place of 20-spirox-4-ene-11β-ol-3-one, there is obtained the corresponding 3-ethoxy-20-spirox-3,5-diene:

9α-fluoro-20-spirox-4-ene-11β-ol-3-one
2α-methyl-9α-fluoro-20-spirox-4-ene-11β-ol-3-one

EXAMPLE 41

Two grams of 20-spirox-4-ene-3-one, 0.120 g. of 2,4-dinitrobenzenesulfonic acid, 60 ml. of dry dioxane and 5 ml. of freshly distilled n-propyl orthoformate are stirred at 30° C. for six hours. The acid catalyst is then neutralized by addition of 2 ml. of pyridine. The reaction mixture is diluted with water and extracted with ether. The combined ether extracts are washed with water, dried, and evaporated under reduced pressure. The residue is chromatographed over alumina (alkaline) and eluted with mixtures of ether and petroleum ether to separate substantially pure 3-n-propoxy-20-spirox-3,5-diene, which has the following structure:

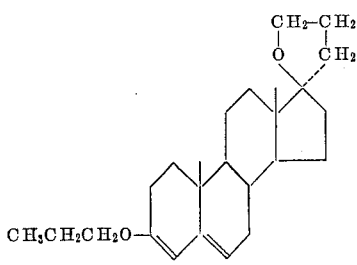

In accordance with the above procedure, but using the following compounds in place of the 20-spirox-4-ene-3-one, there is obtained the corresponding 3-n-propoxy 20-spirox-3,5-diene:

20-spirox-4-ene-3,11-dione
2α-methyl-20-spirox-4-ene-3-one
2α-methyl-9α-fluoro-20-spirox-4-ene-3,11-dione
20-spirox-4-ene-11β-ol-3-one
9α-fluoro-20-spirox-4-ene-11β-ol-3-one
2α-methyl-9α-fluoro-20-spirox-4-ene-11β-ol-3-one

EXAMPLE 42

A mixture of 5 g. of 20-spirox-4-ene-3-one, 550 ml. of iso-octane (2,2,4-trimethylpentane), 2.5 ml. of n-butanol and 0.25 g. of p-toluenesulfonic acid is refluxed for 32 hours employing an apparatus (similar to that described in Organic Synthesis, Collective vol. III (1955), page 382) equipped in such a way that the iso-octane falling from the condenser before returning to the flask is separated from the water entrained by it, by means of a suitable trap supplied with an inner funnel containing phosphorus pentoxide mixed with a filter aid (Celite and the like). After cooling, 1 ml. of pyridine is added to neutralize the p-toluenesulfonic acid and the liquid is completely evaporated in vacuo to dryness to give a residue of 3-n-butoxy-20-spirox-3,5-diene, which has the following formula:

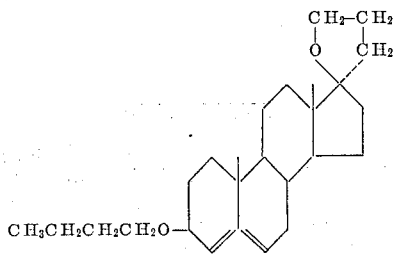

In accordance with the above procedure, but using the following compounds in place of the 20-spirox-4-ene-3-one, there is obtained the corresponding 3-n-butoxy-20-spirox-3,5-diene:

20-spirox-4-ene-11-dione
2α-methyl-20-spirox-4-ene-3-one
2α-methyl-9α-fluoro-20-spirox-4-ene-3,11-dione
20-spirox-4-ene-11β-ol-3-one
9α-fluoro-20-spirox-4-ene-11β-ol-3-one
2α-methyl-9α-fluoro-20-spirox-4-ene-11β-ol-3-one

EXAMPLE 43

A mixture of 5 g. of 20-spirox-4-ene-3-one, 550 ml. of iso-octane (2,2,4-trimethylpentane), 2.5 ml. of cyclohexanol and 0.25 g. of p-toluenesulfonic acid is refluxed for 32 hours employing an apparatus (similar to that described in Organic Synthesis, Collective vol. III (1955), page 382) equipped in such a way that the iso-octane falling from the condenser before returning to the flask is separated from the water entrained by it, by means of a suitable trap supplied with an inner funnel containing phosphorus pentoxide mixed with a filter aid (Celite and the like). After cooling, 1 ml. of pyridine is added to neutralize the p-toluenesulfonic acid and the liquid is completely evaporated in vacuo to dryness to give a residue of 3-cyclohexyloxy-20-spirox-3,5-diene, which has the following formula:

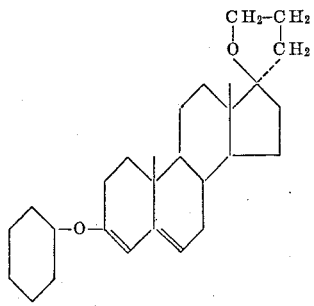

In accordance with the above procedure, but using the following compounds in place of 20-spirox-4-ene-3-one, there is obtained the corresponding 3-cyclohexyloxy-20-spirox-3,5-diene:

20-spirox-4-ene-3,11-dione
2α-methyl-20-spirox-4-ene-3-one
2α-methyl-9α-fluoro-20-spirox-4-ene-3,11-dione
20-spirox-4-ene-11β-ol-3-one
9α-fluoro-20-spirox-4-ene-11β-ol-3-one
2α-methyl-9α-fluoro-20-spirox-4-ene-11β-ol-3-one

EXAMPLE 44

To a mixture of 125 ml. of benzene and 2.1 ml. of benzyl alcohol is added 30 mgm. of p-toluenesulfonic acid. A small portion of benzene is distilled from the solution to remove traces of moisture. To the remaining solution is added 1 g. of 3-ethoxy-20-spirox-3,5-diene. The mixture is then heated at the boiling point for 30 minutes with slow, continuous co-distillation of benzene and ethanol. The reaction mixture is then cooled to room temperature, made alkaline by the addition of a few drops of pyridine, and concentrated to dryness under reduced pressure to give a residue of 3-benzyloxy-20-spirox-3,5-diene, which has the following formula:

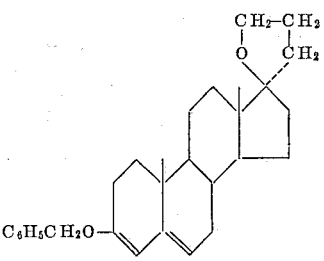

In accordance with the above formula, but using the following compounds in place of the 3-ethoxy-20-spirox-3,5-diene, there is obtained the corresponding 3-benzyloxy-20-spirox-3,5-diene:

20-spirox-4-ene-3,11-dione
2α-methyl-20-spirox-4-ene-3-one
2α-methyl-9α-fluoro-20-spirox-4-ene-3,11-dione
20-spirox-4-ene-11β-ol-3-one
9α-fluoro-20-spirox-4-ene-11β-ol-3-one
2α-methyl-9α-fluoro-20-spirox-4-ene-11β-ol-3-one

EXAMPLE 45

To 3 g. of 3-methoxy-17α-(3'-hydroxypropyl)-1,3,5(10)-estratriene-17β-ol in 7 ml. of pyridine is added 2 g. of p-toluenesulfonyl chloride. The solution is stirred for 16 hours at room temperature. Water is then added dropwise until crystals appear. The crystals are collected on a filter and washer with water to yield 2.88 g. of 3- methoxy-19-nor-20-spirox-1,3,5(10)-triene, melting at 113–120° C., which has the following formula:

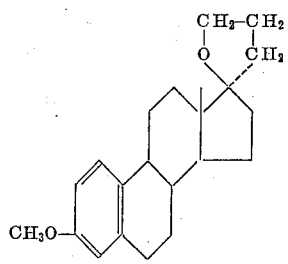

EXAMPLE 46

3-methoxy-19-nor-20-spirox-1,3,5(10)-triene (2.2 gm.) is added to a mixture of 120 ml. of anhydrous ammonia and 40 ml. of tetrahydrofuran at −80° C. Over a one hour period 1.6 gms. of lithium, cut into small portions, is added. After an additional three hours, ethanol is added dropwise until the characteristic blue color disappears. The ammonia is allowed to evaporate, water is added cautiously and the solution is extracted with ethyl acetate. The extract is washed with water until neutral and dried over sodium sulfate. Removal of the solvent under reduced pressure leaves a residue of 3-methoxy-19-nor-20-spirox-2,5(10)-diene, which has the following formula:

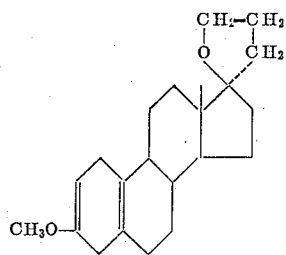

EXAMPLE 47

To a solution of 1 g. of crude 3-methoxy-19-nor-20-spirox-2,5(10)-diene in 30 cc. of ethanol is added 500 mg. of oxalic acid in 10 cc. of water. The reaction mixture is allowed to stand at room temperature overnight. Water is added and the steroid is extracted with ether. The ethereal solution is washed with water and then dried. The solvent is then removed by distillation in vacuo. The residual oil thus obtained is separated by chromatography on alumina and elution with a mixture of ether and petroleum ether. The 8:2 petroleum ether:ether fractions give the 19-nor-20-spirox-5(10)-ene-3-one, which can be crystallized from petroleum ether. The compound has the structural formula:

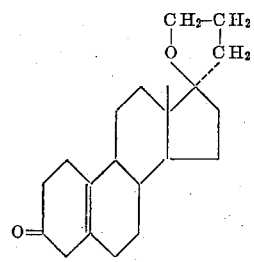

EXAMPLE 48

To a solution of 800 mg. of 19-nor-20-spirox-5(10)-ene-3-one in 20 cc. of dry methanol is added 0.5 cc. of 1 M sodium methylate. The mixture is allowed to stand at room temperature for 15 minutes and is then neutralized with a solution of sodium dihydrogen phosphate in water. The product is extracted with ether and the ether extract is washed with water and dried. After evaporation of the ether the residue in petroleum ether (plus just enough benzene to effect solution) is chromatographed on acid washed alumina and eluted with mixtures of ether and petroleum ether. The 7:3 petroleum ether:ether fractions yield 350 mg. of 19-nor-20-spirox-4-ene-3-one which can be recrystallized from ether. The compound has the structural formula:

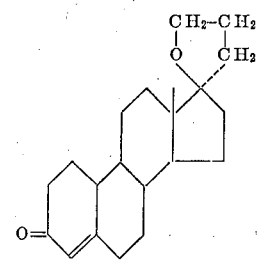

EXAMPLE 49

A suspension of 19-nor-20-spirox-4-ene-3-one (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 19-nor-20-spirox-4,6-diene-3-one which has the following formula:

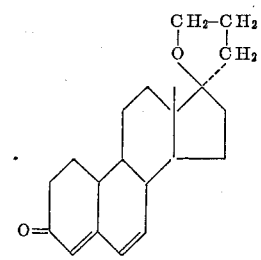

EXAMPLE 50

A solution of 80 mg. of 19-nor-20-spirox-4,6-diene-3-one in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane gives 7α-acetylthio-19-nor-20-spirox-4-ene-3-one which has the following formula:

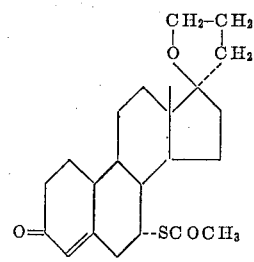

EXAMPLE 51

A mixture of 1.5 parts by weight of 19-nor-20-spirox-4,6-diene-3-one and 1.5 parts by volume of thiopropionic acid is heated on the steam bath for 3 hours. After standing overnight, the reaction mixture is diluted with 25 parts by volume of ether. The crystals which form on cooling are separated and recrystallized from ether and petroleum ether to obtain 7α-propionylthio-19-nor-20-spirox-4-ene-3-one which has the following structure:

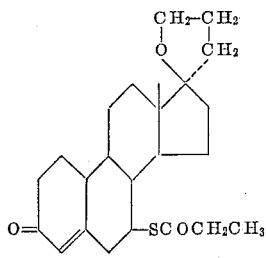

EXAMPLE 52

A mixture of 3 g. of 20-spirox-4-ene-7α-thiol-3-one acetate, 35 ml. of dry benzene and 2.75 g. of 2,3-dichloro-5,6-dicyanobenzoquinone is maintained at reflux for 8 hours in an atmosphere of nitrogen. The entire reaction mixture is diluted with about 100 ml. of benzene and 30 ml. of water. The resulting two-phase system is shaken with approximately 15 ml. of 0.5 N NaOH. The nearly black aqueous layer is discarded and the benzene layer washed with small portions of water until the washings are colorless. The NaOH—H$_2$O extraction is repeated until the washings are colorless. The benzene solution is dried with anhydrous Na$_2$SO$_4$ separated from the drying agent by filtration and the solvent is evaporated in vacuo. The residue, 20-spiroxa-1,4-diene-7α-thiol-3-one acetate, which has the structure:

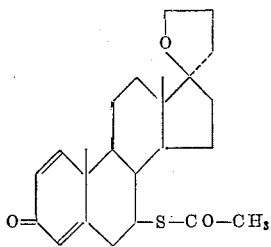

is crystallized from acetone-petroleum ether for analysis. Found: λ max. 239 mμ, ε percent 387.

Similarly, when the same procedure is used but starting with 9α-fluoro-7α-acetylthio-20-spirox-4-ene-3,11-dione, the corresponding 1,4-diene is obtained.

EXAMPLE 53

A magnetically stirred mixture of 400 mg. (1 mmole) of 20-spirox-4-ene-7α-thiol-3-one acetate and 15 ml. of dry methanol is heated to boiling and then cooled to room temperature in an atmosphere of dry nitrogen. Sodium methoxide (2.2 ml. of a 1 M solution is methanol) is added rapidly and the resultant mixture stirred at room temperature for 9 minutes under nitrogen. Two drops of glacial acetic acid are then added, followed by water until crystallization is complete. The product, 20-spirox-4-ene-7α-thiol-3-one, which has the structure:

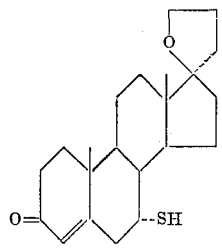

is collected by filtration, washed well with water and dried. It can be recrystallized for analysis from methanol. Found $\lambda_{max.}^{CH_3OH}$ 240 mμ, ε percent 400

Similarly, when the starting material in the above procedure is an equivalent quantity of:

20-spirox-1,4-diene-7α-acetylthio-3-one
19-nor-20-spirox-4-ene-7α-acetylthio-3-one
20-spirox-1,4-diene-7α-propionylthio-3-one
20-spirox-4-ene-11β-ol-7α-acetylthio-3-one
20-spirox-4-ene-7α-acetylthio-3,11-dione, or
9α-fluoro-20-spirox-1,4-diene-7-acetylthio-3,11-dione, the corresponding 7α-thiol is obtained.

EXAMPLE 54

A mixture of 200 mg. of II (20-spirox-4-ene-7α-thiol-3-one), 3 ml. of reagent methanol and 1 ml. of 30% aqueous hydrogen peroxide is stirred at room temperature for one-half hour, after which the reaction mixture is diluted with 20 ml. of water and extracted with benzene. The benzene solution is washed with 3×5 ml. portions of water and then dried with anhydrous Na$_2$SO$_4$. After filtration, the benzene is evaporated in vacuo leaving crude bis-(20-spirox-4-ene-3-one)-7α-disulfide, which can be crystallized from very concentrated benzene solutions. Molecular wt. found: 750;

$\lambda_{max.}^{MeOH}$ 239 mμ, ε percent 220

The product has the structure:

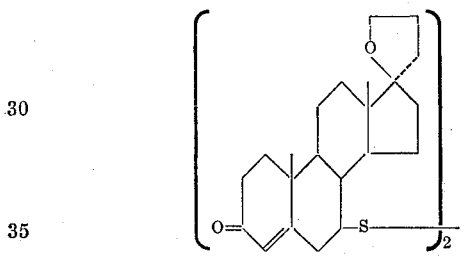

When the other 7α-thiols prepared in Example 58 are used in the above procedure in equivalent quantities, the corresponding disulfides are obtained.

EXAMPLE 55

20-spirox-4-ene-7α-thiol-3-one is stirred in pyridine solution while a molecular excess of t-butylacetyl chloride is added dropwise. After the reaction mixture has been allowed to stand for 45 minutes, excess acid chloride is destroyed by the addition of water. The product is extracted with ether and the extract is washed successively with 2.5 N sulfuric acid (to remove pyridine), water, aqueous 5% sodium bicarbonate (to remove acidic materials) and water. The extract is then dried and the solvents are evaporated in vacuo. The product has the structure:

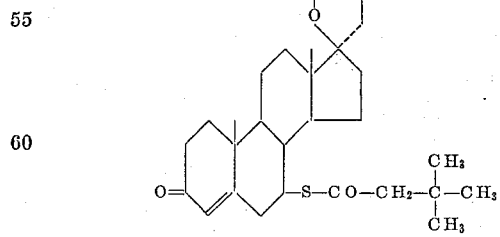

When other lower alkaonyl chlorides are used in the above procedure, the corresponding 7α-lower alkanoylthio compounds are obtained.

When the spiroxenone is stirred at room temperature with excess 98% formic acid for 48 hours, the corresponding formylthio compound is formed. It can be isolated by evaporation of the formic acid and purified by recrystallization and/or chromatography.

When any of the other 7α-thiols prepared in Example 58 is used in equivalent quantity in the above procedures, the corresponding 7α-alkanoylthio compound is obtained.

EXAMPLE 56

A suspension of 200 mg. of 20-spirox-4-ene-7α-thiol-3-one, 500 mg. of anhydrous K₂CO₃ and 5 ml. of dry acetone is stirred at room temperature for 20 minutes. To the above is added a second suspension prepared by stirring for 20 minutes 250 mg. of BrCH₂COOH and 500 mg. of anhy. K₂CO₃ in 5 ml. of dry acetone. The resulting mixture is stirred at room temperature for 18 hours. The acetone is evaporated in vacuo and the residue in water is acidified to pH 1 with dil. sulfuric acid. The products are collected by extraction into ethyl acetate. The ethyl acetate extract is then extracted with 4–5 ml. portions of saturated aqueous NaHCO₃ and the bicarbonate extracts are immediately acidified with dilute H₂SO₄ to pH 1. The acidic material is extracted into ethyl acetate. The resulting extract is washed once with water, dried and the solvent is removed in vacuo. Excess BrCH₂COOH is removed from the residue by an exhaustive extraction with boiling petroleum ether. The residue, crude 20-spirox-4-ene-7α-carboxymethylthio-3-one, of the structure:

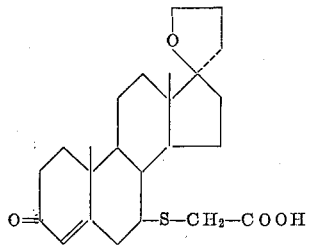

is crystallized for analysis from benezene.

$\lambda_{max.}^{CH_3OH}$ 239 m$\mu$, $\epsilon$ percent 380

When equivalent quantities of α-bromobutyric acid, methyl iodide, ethyl iodide, butyl bromide, hexyl bromide, propyl bromide, lauryl bromide or octadecyl bromide are used in the above procedure in place of the bromoacetic acid, there is obtained 20-pirox-4-ene-7α-carboxypropylthio, methylthio, ethylthio, butylthio, hexylthio, propylthio, laurylthio, or octadecylthio-3-one.

When any of the other 7α-thiols prepared in Example 53 are used in equivalent quantities in the above procedure with any of these reagents, the corresponding 7α-substituted compounds are obtained.

EXAMPLE 57

One gram of 20-spirox-4-ene-3-one is stirred at room temperature in a mixture of 2 ml. of ethyl orthoformate, 10 ml. of absolute ethanol and 30 mg. of 2,4-dinitrobenzenesulfonic acid. After forty-five minutes, several drops of pyridine and some ether are added. The reaction mixture is extracted with dilute sodium bicarbonate, dried and taken to dryness finally at the oil pump on a rotating evaporator at 90°.

The entire crude enol ether is dissolved in 10 ml. of dry ether, cooled at 0° and to it there is added dropwise 6.7 ml. of 0.5 molar perphthalic acid. After 18 hours at room temperature the ether is extracted with dilute sodium bicarbonate and removed. Chromatography on silica gel affords crystalline 20-spirox-4-ene-6β-ol-3-one which is recrystallized from acetone and hexane. It has the structure:

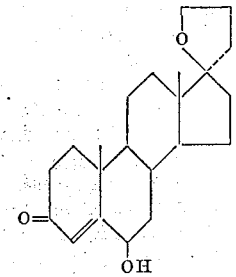

Similarly, the use of equivalent quantities of 19-nor-20-spirox-4-ene-3-one, 20-spirox-1,4-diene-3-one, 20-spirox-4-ene-11β-ol-3-one, 20-spirox-1,4-diene-3,11-dione and 9α-fluoro-20-spirox-1,4-diene-3,11-dione in the above procedure yields the corresponding 6β-hydroxy compound.

EXAMPLE 58

Five-hundred milligrams of 20-spirox-4-ene-6β-ol-3-one is treated at room temperature for eighteen hours with 3 ml. of acetic anhydride and 3 ml. of pyridine. Evaporation of the reaction mixture on a rotating evaporator, using a high vacuum at the end, leaves a residue of 20-spirox-4-ene-6β-ol-3-one 6-acetate, of the structure:

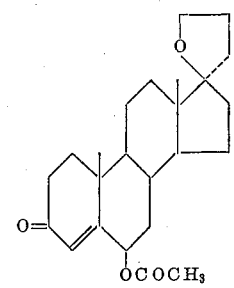

Similarly, when the other 6β-hydroxy compounds of Example 57 are used in the above procedure, the corresponding esters are obtained.

EXAMPLE 59

Three-hundred milligrams of 20-spirox-4-ene-6β-ol-3-one 6-acetate is dissolved in 30 ml. of chloroform to which 0.5 ml. of ethanol is added. This solution is cooled at 0° and a stream of dry HCl gas is passed through it for one and one-half hours. The reaction mixture is poured into ice cold sodium bicarbonate solution and the organic layer is washed several more times with aqueous sodium bicarbonate. Removal of the dried organic layer and chromatography on neutral alumina affords 20-spirox-4-ene-6α-ol-3-one 6-acetate. Fifty milligrams of this material in 2 ml. of methanol is treated with 1.1 equivalents of methanolic potassium hydroxide (1 ml. of a solution containing 8 mg. of KOH per ml. of methanol) for two hours at room temperature. The solvent is then removed on the rotating evaporator under vacuum and the residue is dissolved in chloroform and washed several times with water. Removal of the dried solvent leaves a residue which contains 20-spirox-4-ene-6α-ol-3-one, of the structure:

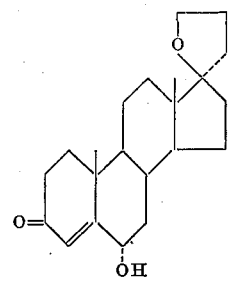

Similarly, the other β-acyloxy compounds of Example 58 are converted by the above process to the 6α-hydroxy compounds.

EXAMPLE 60

A solution of 22.9 g. of 3-ethylenedioxy-20-spirox-4-ene in benzene is added to 460 ml. of perbenzoic acid solution over 30 minutes, keeping the temperature at 20–25° C. After 48 hours at room temperature, when 120% of the theory of perbenzoic acid is consumed, the solution is cooled to 10° and a 15% NaHSO₃ solution is added with stirring below 20° to a negative KI test. The aqueous phase is removed and the benzene layer washed acid free with 5% NaHCO₃ and then with water. The solution is dried and concentrated in vacuo. The solid residue, a mixture of α and β epoxy isomers is separated by chromatography on Florosil, 180 g. per gram of isomers. Elution with 5% acetone in hexane gives the β-isomer. Elution with 10% acetone in hexane gives the α-isomer which can be recrystallized from benzene and hexane. It has the formula:

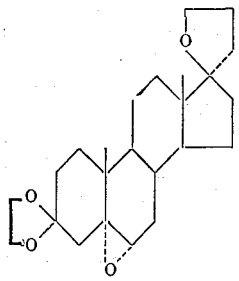

EXAMPLE 61

One gram of the 5,6 epoxy compound produced in Example 60 is dissolved in 50 cc. of dry benzene and 50 cc. of dry ether. Freshly distilled BF₃-etherate (0.83 cc.) is added and the solution is allowed to stand overnight at room temperature. The resulting yellow solution is added dropwise to 100 cc. of saturated aqueous NaHCO₃ solution with good stirring. The layers are separated and the organic layer washed with aqueous NaHCO₃, then with water and dried. The solution is evaporated to dryness and the residue is chromatographed on Florosil. Elution with 3% acetone in hexane gives a product of the formula:

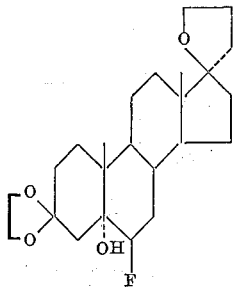

This product (292 mg.) is dissolved in 14 cc. of acetone and 20 mg. of p-toluene sulfonic acid monohydrate is added. After the solution has been allowed to stand overnight, it is diluted with H₂O and extracted with ether. The aqueous layer is doubled in volume and again extracted with ether twice. The extracts are washed with water, dried and concentrated in vacuo. The residue is chromatographed on 8 g. of acid-washed alumina and eluted with 8:2 ether-chloroform to give a 6β-fluoro product of the structure:

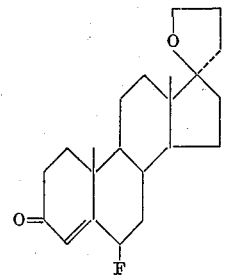

270 mg. of this product is suspended in 19 cc. of methanol containing 1 cc. of 5% aqueous KOH. The reaction system is purged with nitrogen and the mixture is then heated to reflux for one hour. The mixture is then neutralized with acetic acid and diluted with water.

The precipitated product, isolated by filtration and dried, has the formula:

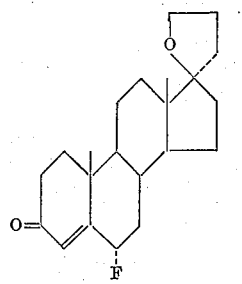

EXAMPLE 62

To a solution of 250 mg. of the product of Example 60 in 600 ml. of dry benzene is added 2.33 ml. of 3 M methylmagnesium bromide in ether. The mixture is heated at 70° C. under nitrogen for 5 hours and then cooled to 0–5°. A solution of 5.6 g. of NH₄Cl in 56 ml. of water is added over approximately 20 minutes. The benzene is separated and the aqueous layer is extracted twice with 20 ml. of benzene. The combined benzene extracts are washed neutral with water, dried over MgSO₄ and concentrated to dryness.

The product is dissolved in 100 ml. of methanol and the reaction system is purged with nitrogen. Then, 10.9 ml. of 8% H₂SO₄ is added and the system is again purged with nitrogen. The mixture is refluxed under nitrogen for 35 minutes and then cooled to 0–5° C. A solution of 10.9 g. of Na₂CO₃ in 300 ml. of water is added with cooling and agitation. The separated product is extracted with chloroform, and the extract washed with water and concentrated in vacuo.

The residual product, the 6β-methyl compound, is dissolved in 100 ml. of methanol and the system is thoroughly purged with nitrogen. A solution of 4.2 ml. of 5% KOH in methanol is added and the system is again purged with nitrogen. The mixture is cooled to 20° C. and acidified with glacial acetic acid. Water (25 ml.) is added and the solution is concentrated until no methanol is left. The precipitated 6α-methyl compound of the formula:

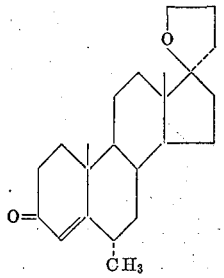

is filtered and dried. When used in the procedures of Examples 1, 2 and 3, it gives 6α-methyl-20-spirox-4-ene-3-one.

EXAMPLE 63

When 16α or β-methyl-20-spirox-4-ene-3,21-dione is converted to the 3-ethylene dioxy compound and reduced, using the procedure of Example 1, followed by ring closure by the procedure of Example 2, and cleavage of the ethylene dioxy ring by the procedure of Example 3, there is obtained the 16α or β-spiroxenone of the formula:

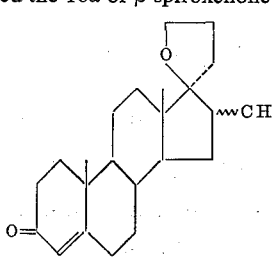

When this is oxidized by the method of Example 4, the corresponding 1,4-diene is obtained. When used in the procedure of Example 5, the 4,6-diene is obtained and this, in the procedure of Example 6, gives the corresponding $\Delta^4$-7-acetylthio compound. When the compound of the above formula is used in the procedure of Example 8, the corresponding 2,16-dimethyl compound is formed. Similarly, when used in the procedures of Examples 60 and 62, the 6,16-dimethyl compound is formed from the 16-methyl compound and the 2,6,16-trimethyl compound is formed from the 2,16-dimethyl compound.

EXAMPLE 64

The procedure of Example 8 is followed through the first paragraph. Then, to a suspension of the crude sodium enolate in benzene is added a solution of chlorine in benzene, containing 1.2 equivalents of chlorine per mole of the steriod. After standing for 3 hours at room temperature, a large amount of water is added and the mixture is extracted with ethyl acetate. The extract is washed with saturated brine, dried and treated with activated carbon. The solvent is then evaporated and the residue is treated by the procedure of the last paragraph of Ex-axmple 8 to yield a product of the formula:

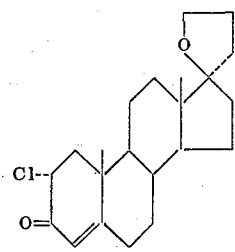

Similarly, when, instead of the above, the product of the first paragraph is dissolved in dimethoxyethane and a stream of dry $FClO_3$ is bubbled through the solution for 15 minutes, after which water is added, the mixture worked up as described above and subjected to the procedure of the last paragraph of Example 8, the corresponding $2\alpha$-fluoro derivative is obtained, having the structure:

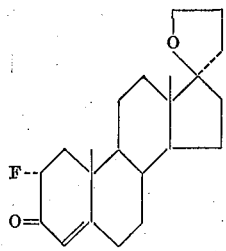

Both these products are used in the procedures of Examples 9, 10 and 11 to give the correspondingly substituted products.

We claim:
1. A compound of the formula

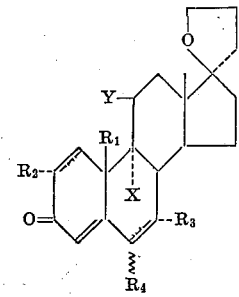

in which
$R_1$ and $R_2$ are each selected from the group consisting of hydrogen and methyl;
$R_3$ is selected from the group consisting of hydrogen, lower alkanoylthio, mercapto, —S—S—$R_5$ in which $R_5$ is a duplicate steroid nucleus to that attached to the other sulfur, and carboxymethylthio
$R_4$ is selected from the group consisting of hydrogen, hydroxyl and lower alkanoyloxy;
Y is selected from the group consisting of hydrogen, $\beta$-hyroxyl and keto oxygen;
X is selected from the group consisting of hydrogen and halogen; and
the dotted lines joining carbons 1 and 2 and carbons 6 and 7 show that each of these bonds is selected from the group consisting a single and double bonds, the 6, 7 bond being a double bond only when $R_3$ and $R_4$ are both hydrogen.

2. $7\alpha$-acetylthio-20-spirox-4-ene-3-one.
3. $7\alpha$-propionylthio-20-spirox-4-ene-3-one.
4. $7\alpha$-lower alkanoylthio-20-spirox-4-ene-3-one.
5. $7\alpha$-lower alkanoylthio - $9\alpha$ - fluoro - 20 - spriox-4-ene-$11\beta$-ol-3-one.
6. $7\alpha$ - lower alkanoylthio - $9\alpha$ - fluoro - 20 - spirox-4-ene-3,11-dione.
7. $2\alpha$ - methyl - $7\alpha$ - lower alkanoylthio - 20 - spirox-4-ene-3-one.
8. $2\alpha$ - methyl - $9\alpha$ - fluoro - $7\alpha$ - lower alkanoylthio-20-spirox-4-ene-$11\beta$-ol-3-one.
9. $2\alpha$ - methyl - $9\alpha$ - fluoro - $7\alpha$ - lower alkanoylthio-20-spirox-4-ene-3,11-dione.
10. 19-nor-20-spirox-4,6-diene-3-one.
11. $7\alpha$-acetylthio-19-nor-20-spirox-4-ene-3-one.
12. $7\alpha$ - propionylthio - 19 - nor - 20 - spirox - 4 - ene-3-one.
13. A compound of the formula

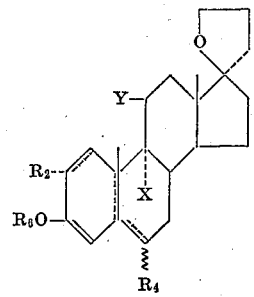

in which
$R_2$ is selected from the group consisting of hydrogen and methyl;
$R_4$ is selected from the group consisting of hydrogen, hydroxyl and lower alkanoyloxy;
X is selected from the group consisting of hydrogen and halogen
Y is selected from the group consisting of hydrogen, $\beta$-hydroxyl and keto oxygen;
$R_6$ is selected from the group consisting of lower alkyl, benzyl and cyclohexyl; and
the dotted lines joining carbons 1 and 2, carbons 5 and 10 indicated that each of those bonds are selected from the group consisting of single and double bonds, the 5, 10 bond being double and the 5, 6 bond single when $R_1$ is hydrogen and the 5, 6 bond being double with the 5, 10 bond single when $R_1$ is methyl.

14. 3 - methoxy - 19 - nor - 20 - spirox - 2,5(10)-diene.
15. A compound of the formula:

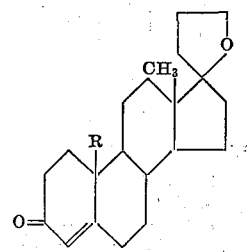

wherein R is selected from the group consisting of hydrogen and the methyl radical.

16. A compound of the formula:

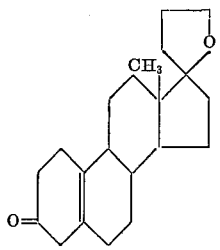

17. A compound of the formula:

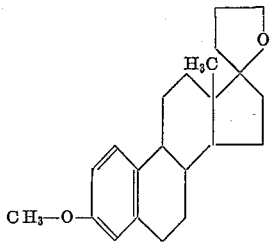

18. The process of preparing a compound of the structure

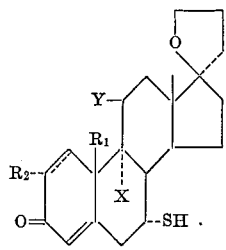

in which
$R_1$ and $R_2$ are selected from the group consisting of hydrogen and methyl;
X is selected from the group consisting of hydrogen and halogen;
Y is selected from the group consisting of hydrogen, keto oxygen and $\beta$-hydroxyl; and
the dotted line joining carbons 1 and 2 shows that bond is selected from the group consisting of single and double bonds;
which comprises heating the corresponding 7-lower alkanoylthio compound in an alkanol with at least an equivalent weight of a strong base in the absence of nitrogen.

19. The process of preparing a compound of the structure

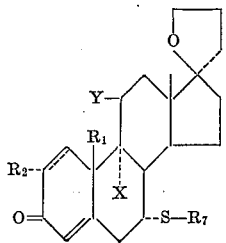

in which
$R_1$ and $R_2$ are each selected from the group consisting of hydrogen and methyl;
$R_7$ is selected from the group consisting of alkyl and carboxy lower alkyl;
X is selected from the group consisting of hydrogen and halogen;
Y is selected from the group consisting of hydrogen, $\beta$-hydroxyl and keto oxygen; and
the dotted line joining carbons 1 and 2 shows that bond is selected from the group consisting of single and double bonds which comprises agitating a mixture of the corresponding 7$\alpha$-thiol in an inert solvent in the presence of an acid acceptor and a reagent selected from the group consisting of alkyl halides and halogeno-lower-alkanoic acids.

20. The process of preparing a compound of the formula

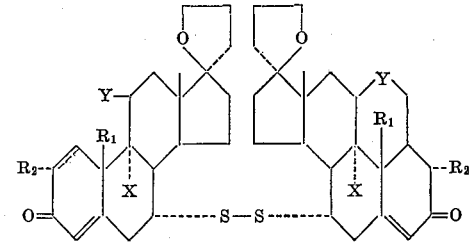

in which
$R_1$ and $R_2$ are each selected from the group consisting of hydrogen and methyl;
X is selected from the group consisting of hydrogen and halogen;
Y is selected from the group consisting of hydrogen, $\beta$-hydroxyl and keto oxygen; and
the dotted line joining carbons 1 and 2 shows that bond is selected from the group consisting of single and double bonds which comprises agitating the corresponding 7$\alpha$-thiol at room temperature in an alcoholic solution with hydrogen peroxide until disulfide formation is substantially complete.

21. The process of preparing a compound of the structure

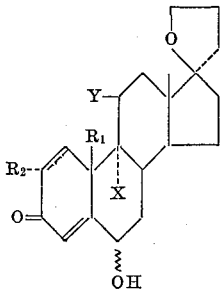

in which
$R_1$ and $R_2$ are each selected from the group consisting of hydrogen and methyl;
X is selected from the group consisting of hydrogen and halogen;
Y is selected from the group consisting of hydrogen, $\beta$-hydroxyl and keto oxygen; and
the dotted line joining carbons 1 and 2 shows that bond is selected from the group consisting of single and double bonds which comprises agitating a mixture of the corresponding 6-hydrogen compound with ethylortho formate in anhydrous alcoholic solution in the presence of a strong sulfonic acid catalyst to form an enol ether and agitating said enol ether, after inhalation, in the cold in an inert solvent with an organic peracid to form the 6$\beta$-hydroxy compound and converting said 6$\beta$-ol to the the 6$\alpha$-ol by agitating said 6$\beta$-ol with an alkanoic anhydride and pyridine until the corresponding 6$\beta$-alkanoyloxy compound is formed, followed by hydrolysis of said alkanoyloxy compound with a hydrogen halide.

References Cited by the Examiner

UNITED STATES PATENTS 3,137,690   6/1964   Johns _____ 260—239.55

LEWIS GOTTS, *Primary Examiner.*

MORRIS LIEBMAN, *Examiner.*

HENRY A. FRENCH, J. R. GENTRY, JOHNIE R. BROWN, *Assistant Examiners.*